(12) United States Patent
Kajihara et al.

(10) Patent No.: US 12,499,041 B2
(45) Date of Patent: Dec. 16, 2025

(54) MEMORY SYSTEM LIMITING RANGE OF SCAN IN GARBAGE COLLECTION

(71) Applicant: Kioxia Corporation, Tokyo (JP)

(72) Inventors: Hirotsugu Kajihara, Yokohama (JP); Yu Nakanishi, Yokohama (JP); Kohei Oikawa, Kawasaki (JP); Kazuhiro Hiwada, Kamakura (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/581,505

(22) Filed: Feb. 20, 2024

(65) Prior Publication Data
US 2024/0281370 A1   Aug. 22, 2024

(30) Foreign Application Priority Data
Feb. 21, 2023   (JP) .................... 2023-025377

(51) Int. Cl.
G06F 12/02   (2006.01)
(52) U.S. Cl.
CPC .. *G06F 12/0246* (2013.01); *G06F 2212/7201* (2013.01); *G06F 2212/7205* (2013.01)
(58) Field of Classification Search
CPC ......... G06F 12/0246; G06F 2212/7201; G06F 2212/7205
See application file for complete search history.

(56) References Cited

U.S. PATENT DOCUMENTS

| | | | |
|---|---|---|---|
| 8,762,627 B2 | 6/2014 | Sela | |
| 11,216,368 B2 | 1/2022 | Um | |
| 12,061,792 B1 * | 8/2024 | Yang | G06F 3/0679 |
| 2009/0271562 A1 * | 10/2009 | Sinclair | G06F 12/0246 711/E12.008 |
| 2012/0084489 A1 * | 4/2012 | Gorobets | G06F 12/0246 711/E12.001 |
| 2014/0068152 A1 | 3/2014 | Sinclair | |
| 2015/0095546 A1 * | 4/2015 | Bennett | G06F 12/00 711/5 |
| 2020/0117592 A1 * | 4/2020 | Berger | G06F 12/0895 |
| 2021/0089455 A1 * | 3/2021 | Berger | G11C 5/144 |
| 2023/0089083 A1 * | 3/2023 | Nishino | G06F 12/0246 711/154 |
| 2023/0138215 A1 | 5/2023 | Hiwada et al. | |

FOREIGN PATENT DOCUMENTS

JP    2023-66803 A    5/2023

* cited by examiner

*Primary Examiner* — Tasnima Matin
(74) *Attorney, Agent, or Firm* — Oblon, McClelland, Maier & Neustadt, L.L.P.

(57) ABSTRACT

According to one embodiment, a memory system includes: a nonvolatile memory including blocks each of which includes physical memory areas; and a memory controller dividing a logical address space into a plurality of banks and associating a block with each of the plurality of banks. The memory controller is configured to: selectively scan a portion related to a first bank among the plurality of banks in a table in which a physical address corresponding to a physical memory area in which valid data is stored is mapped on the logical address space; detect a first physical address corresponding to a first physical memory area in a first block associated with the first bank as a result of the scan; read first valid data stored in the first block based on the first physical address; and write the first valid data in a second block associated with the first bank.

19 Claims, 10 Drawing Sheets

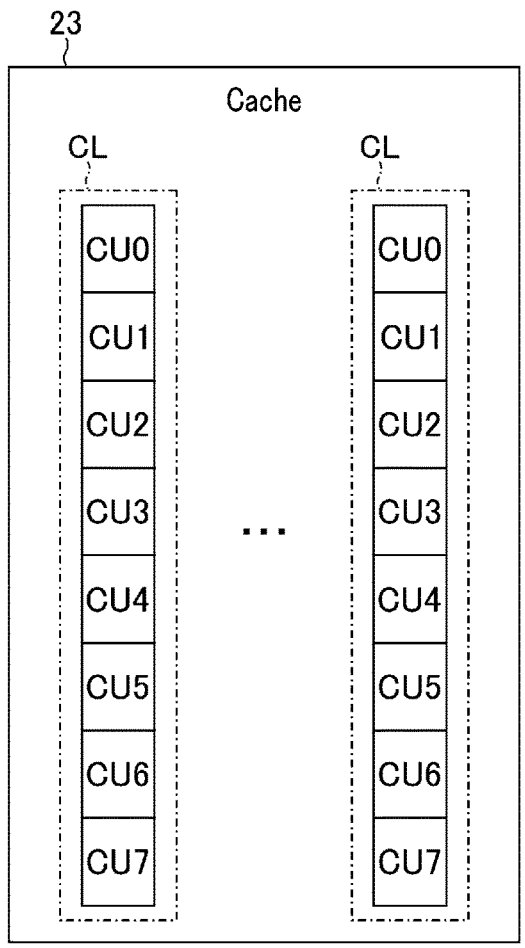
F I G. 6
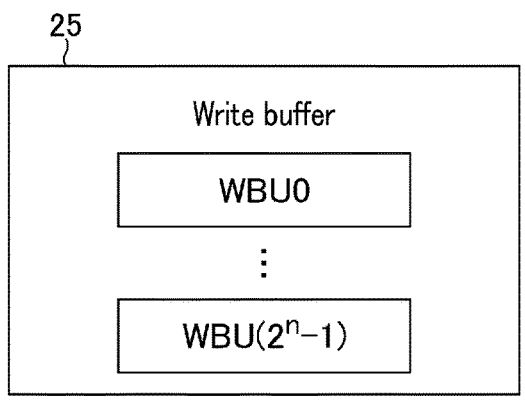
F I G. 7

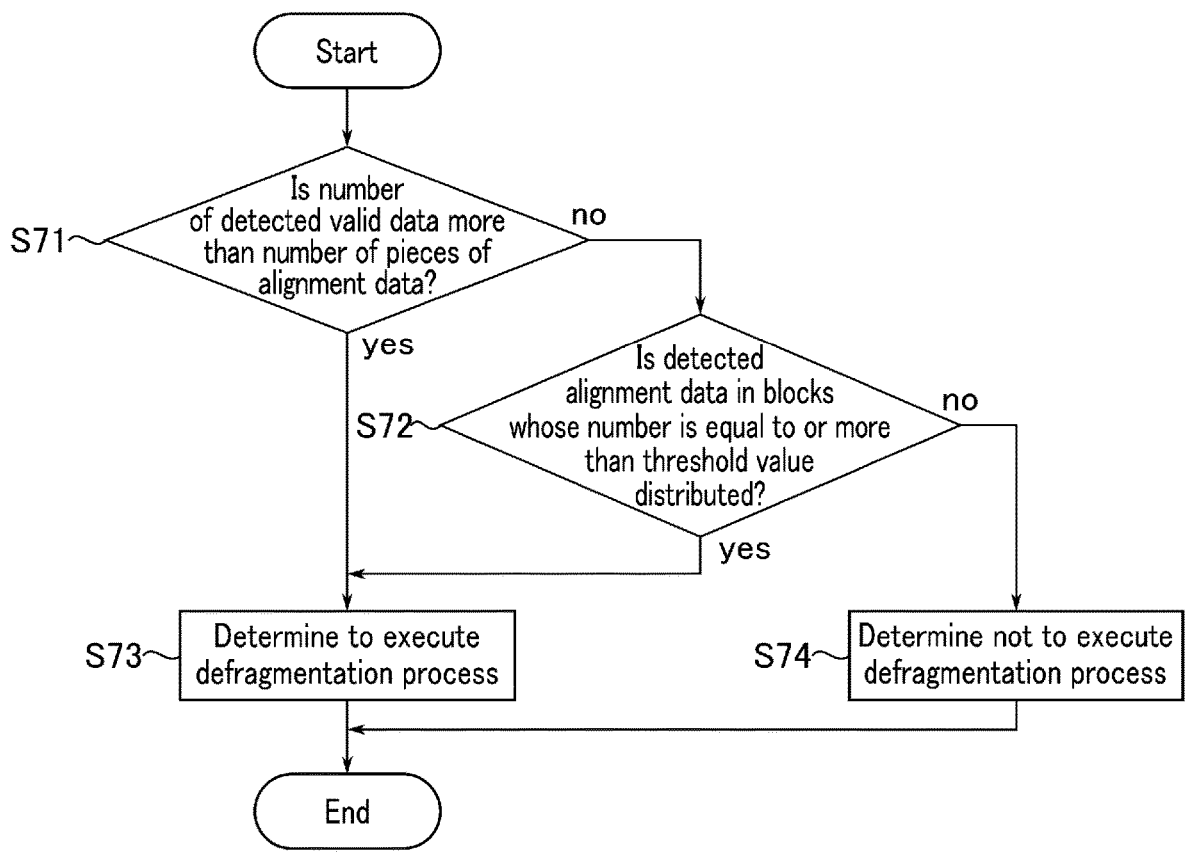
F I G. 17

MEMORY SYSTEM LIMITING RANGE OF SCAN IN GARBAGE COLLECTION

CROSS-REFERENCE TO RELATED APPLICATIONS

This application is based upon and claims the benefit of priority from Japanese Patent Application No. 2023-025377, filed Feb. 21, 2023, the entire contents of which are incorporated herein by reference.

FIELD

Embodiments described herein relate generally to a memory system.

BACKGROUND

A memory system including a NAND flash memory as a nonvolatile memory and a memory controller that controls the nonvolatile memory is known. The memory controller performs a garbage collection (GC) process in order to secure a memory area in which data can be written in the nonvolatile memory.

BRIEF DESCRIPTION OF DRAWINGS

FIG. 6 is a block diagram illustrating an example of a hardware configuration of a cache according to the first embodiment.

FIG. 7 is a block diagram illustrating an example of a hardware configuration of a write buffer according to the first embodiment.

FIG. 17 is a flowchart illustrating a third example of the determination process in the memory system according to the modification of the second embodiment.

DETAILED DESCRIPTION

Figure 1:
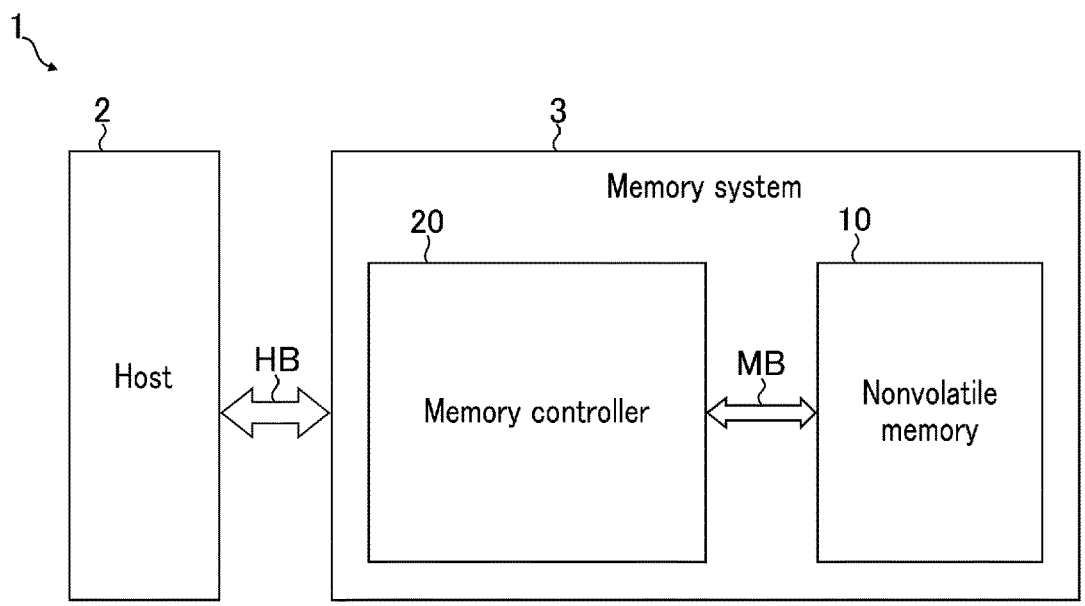
FIG. 1 is a block diagram illustrating an example of a configuration of an information processing system according to a first embodiment.

In general, according to one embodiment, a memory system includes: a nonvolatile memory including a plurality of blocks each of which includes a plurality of physical memory areas; and a memory controller configured to divide a logical address space into a plurality of banks and associate a block with each of the plurality of banks. The memory controller is configured to: selectively scan a portion related to a first bank among the plurality of banks in a table in which a physical address corresponding to a physical memory area in which valid data is stored is mapped on the logical address space; detect a first physical address corresponding to a first physical memory area in a first block associated with the first bank as a result of the scan; read first valid data stored in the first block based on the first physical address; and write the first valid data in a second block associated with the first bank.

Hereinafter, embodiments will be described with reference to the drawings. In the following description, components having the same function and configuration are denoted by the same reference numerals. In addition, in a case where a plurality of components having a common reference sign is distinguished, the common reference sign is added with a suffix to be distinguished. Note that, in a case where a plurality of components does not need to be particularly distinguished, only common reference numerals are attached to the plurality of components, and no suffixes are attached thereto.

1. First Embodiment

1.1 Configuration

1.1.1 Information Processing System

A configuration of an information processing system according to a first embodiment will be described.

FIG. 1 is a block diagram illustrating an example of a configuration of an information processing system according to a first embodiment. As illustrated in FIG. 1, an information processing system 1 includes a host 2 and a memory system 3. The host 2 and the memory system 3 are connected via a host bus HB. The host 2 and the memory system 3 are configured to communicate data of 64 bytes (B) at minimum. Hereinafter, the minimum unit in data communication between the host 2 and the memory system 3 is also referred to as "access granularity". Communication between the host 2 and the memory system 3 conforms to, for example, Computer Express Link™ (CXL™). Specifically, CXL™ standard specifies three interface protocols, which are CXL.mem, CXL.cache, and CXL.io. In this embodiment, Communication between the host 2 and the memory system 3 conforms to CXL.mem protocol.

CXL.mem protocol is a protocol that can process Load/Store instructions issued from a CPU to a main memory. In the following description, read/write requests from the host 2 to the memory system 3 include Load/Store instructions. Note that CXL.mem is an example of a protocol applied to this embodiment, and the protocol applied to this embodiment is not limited to CXL.mem.

The host 2 is, for example, a server in a data center. The host 2 manages a logical address space with a logical address corresponding to the access granularity. The logical address space is a memory address space used by the host 2 to access the memory system 3. In a case where the access granularity is 64B ($=2^6$ B) and the capacity (that is, the capacity of the memory system 3 which can be seen from the host 2) of the logical address space is 256 GB ($=2^{38}$B), the logical address space is expressed by a logical address of 32 ($=38-6$) bits or more. In the following description, it is assumed that the bit width of the logical address is N bits (N is an integer of 2 or more).

The memory system 3 is, for example, a memory card such as an SD™ card, or a memory device such as a universal flash storage (UFS) or a solid state drive (SSD). The memory system 3 manages the logical address space by dividing the logical address space into a plurality of small logical address spaces. Hereinafter, the small logical address space is also referred to as a "bank".

Figure 2:
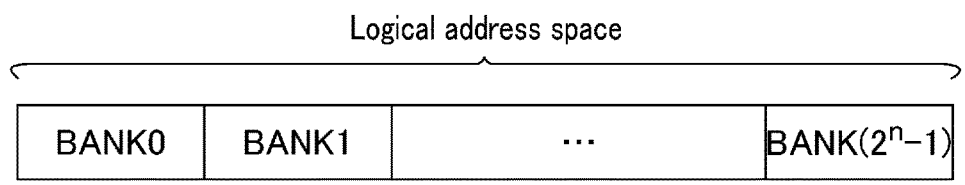
FIG. 2 is a diagram illustrating an example of a configuration of a logical address space managed by a memory system according to the first embodiment.

FIG. 2 is a diagram illustrating an example of a configuration of the logical address space managed by the memory system according to the first embodiment. As illustrated in FIG. 2, the memory system 3 manages the logical address space by dividing the logical address space into $2^n$ banks, BANK (BANK0, BANK1, . . . , BANK($2^n-1$)). Then, the memory system 3 defines a bank address that can uniquely identify each bank BANK. Here, n is a natural number. The number of banks $2^n$ is, for example, 1024 or more.

Figure 3:
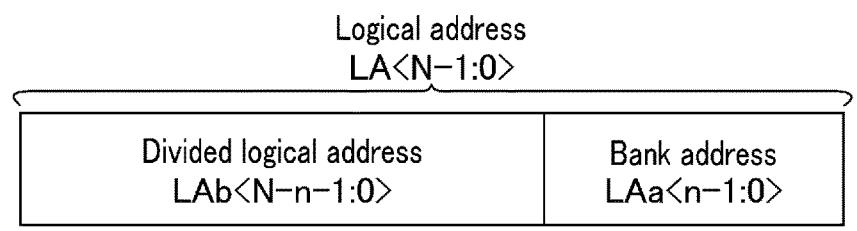
FIG. 3 is a diagram illustrating an example of a configuration of a logical address used in the memory system according to the first embodiment.

FIG. 3 is a diagram illustrating an example of a configuration of a logical address used in the memory system according to the first embodiment. As illustrated in FIG. 3, the memory system 3 divides the N-bit logical address LA <N−1:0> into an n-bit bank address LAa <n−1:0> and an (N−n)-bit divided logical address <N−n−1:0>.

1.1.2 Memory System

Next, an internal configuration of the memory system 3 will be described with reference to FIG. 1 again. The memory system 3 includes a nonvolatile memory 10 and a memory controller 20. The nonvolatile memory 10 and the memory controller 20 are connected via a memory bus MB. Communication between the nonvolatile memory 10 and the memory controller 20 conforms to, for example, a single data rate (SDR) interface, a toggle double data rate (DDR) interface, or an open NAND flash interface (ONFI).

The nonvolatile memory 10 is, for example, a NAND flash memory. The nonvolatile memory 10 has a physical memory area associated with a physical address space. The physical address space is an address space indicating a plurality of storage locations on the physical memory area in the memory system 3. The physical address is an address used by a memory controller 30 to access the physical address space. Specifically, the nonvolatile memory 10 includes a plurality of blocks BLK. Each of the plurality of blocks includes a plurality of memory cells (not shown). The block BLK is, for example, a data erasing unit. Hereinafter, the block BLK in which the valid data is not stored is referred to as a "free block BLK", and is distinguished from the block BLK in which the valid data is stored as necessary.

The memory controller 20 includes, for example, an integrated circuit such as a system-on-a-chip (SoC). The memory controller 20 controls the nonvolatile memory 10 based on a request from the host 2. Specifically, upon receiving a write request from the host 2, the memory controller 20 writes data to be written (write data) to the nonvolatile memory 10. When receiving a read request from the host 2, the memory controller 20 reads data to be read (read data) from the nonvolatile memory 10 to transmit the read data to the host 2.

Note that the memory controller 20 may execute internal processing without depending on a request from the host 2. Examples of the internal processing include a garbage collection (GC) process. The GC process is a process of writing valid data fragmentary stored in one or a plurality of blocks BLK back to one free block BLK to release the one or a plurality of blocks BLK in which the valid data is fragmentary stored as the free block BLK.

1.1.3 Relationship Between Bank and Block

Figure 4:
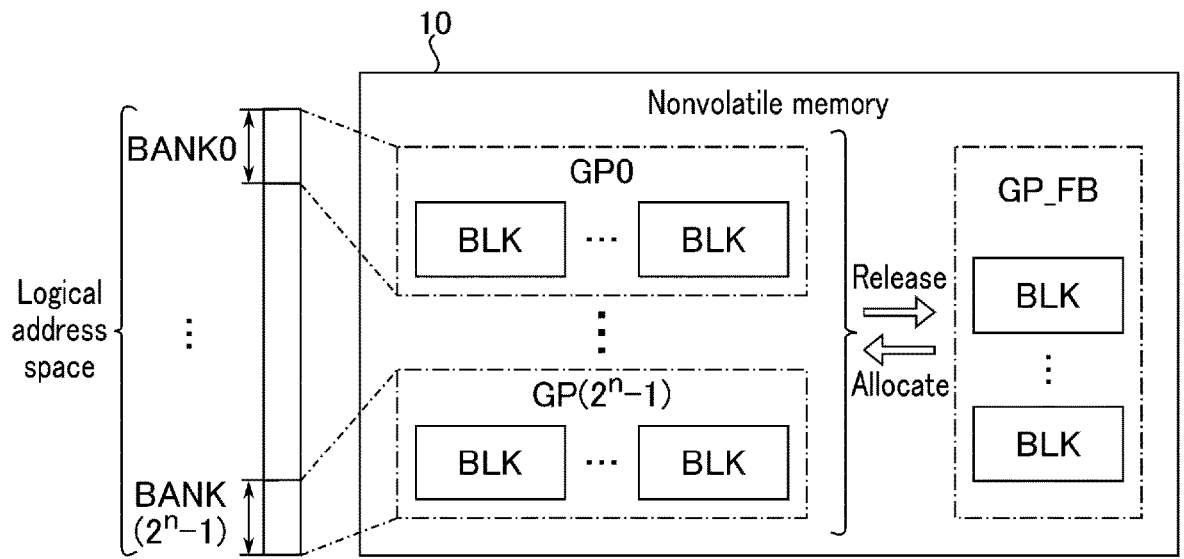
FIG. 4 is a diagram illustrating an example of a relationship between a bank and a block according to the first embodiment.

FIG. 4 is a diagram illustrating an example of a relationship between a bank and a block according to the first embodiment. FIG. 4 illustrates a logical address space divided into $2^n$ banks BANK (BANK0 to BANK($2^n-1$)) and a plurality of blocks BLK in the nonvolatile memory 10.

For example, the memory controller 20 classifies the plurality of blocks BLK in the nonvolatile memory 10 into ($2^n+1$) groups GP0 to GP($2^n-1$) and the GP_FB. Among them, each of the $2^n$ groups GP0 to GP($2^n-1$) includes one or a plurality of blocks BLK storing valid data. The group GP_FB includes all the free blocks BLK in the nonvolatile memory 10.

The memory controller 20 associates $2^n$ groups GP0 to GP($2^n-1$) with $2^n$ banks BANK0 to BANK($2^n-1$), respectively. In other words, the memory controller 20 exclusively limits the block BLK in which data is written between the banks BANK so that the logical address LA corresponding to the write data to be written in the block BLK in a certain group GP has the same bank address LAa.

As a result, the memory controller 20 can identify one or a plurality of blocks BLK belonging to a group GPx associated with a bank BANKx based on the bank address LAa indicating a certain bank BANKx. Specifically, the memory controller 20 stores a GP map table in which each group GP is associated with a set of physical addresses (block addresses) indicating the block BLK belonging to each group GP. As a result, the memory controller 20 can identify the group GP based on the bank address LAa and identify the block BLK belonging to the identified group GP based on the GP map table.

Therefore, the memory controller 20 can identify the physical memory area in which the valid data is stored in the nonvolatile memory 10 with the access granularity by combining the bank address LAa with part of the physical address PA without using the full-size physical address PA. That is, the memory controller 20 can identify the physical memory area in which the valid data is stored in the nonvolatile memory 10 with the access granularity based on the combination of the entry position of the GP map table and the data position in the block BLK indicated by the entry position in the access granularity. Hereinafter, part of the physical address PA that can identify the physical memory area in which the valid data is stored with the access granularity by a combination with the bank address LAa is referred to as a "divided physical address PAa".

In a case where a block BLKx belonging to any one of the groups GP0 to GP($2^n$−1) is released by the GC process to be a free block BLKx, the memory controller 20 cancels the association between the free block BLKx and the bank address LAa. Accordingly, the free block BLKx is allocated to the group GP_FB. Then, instead of the block BLKx, the memory controller 20 newly re-associates any free block BLKy belonging to the group GP_FB with the bank address LAa. Accordingly, the free block BLKy is allocated to any one of the groups GP0 to GP($2^n$−1).

1.1.4 Configuration of Memory Controller

Figure 5:
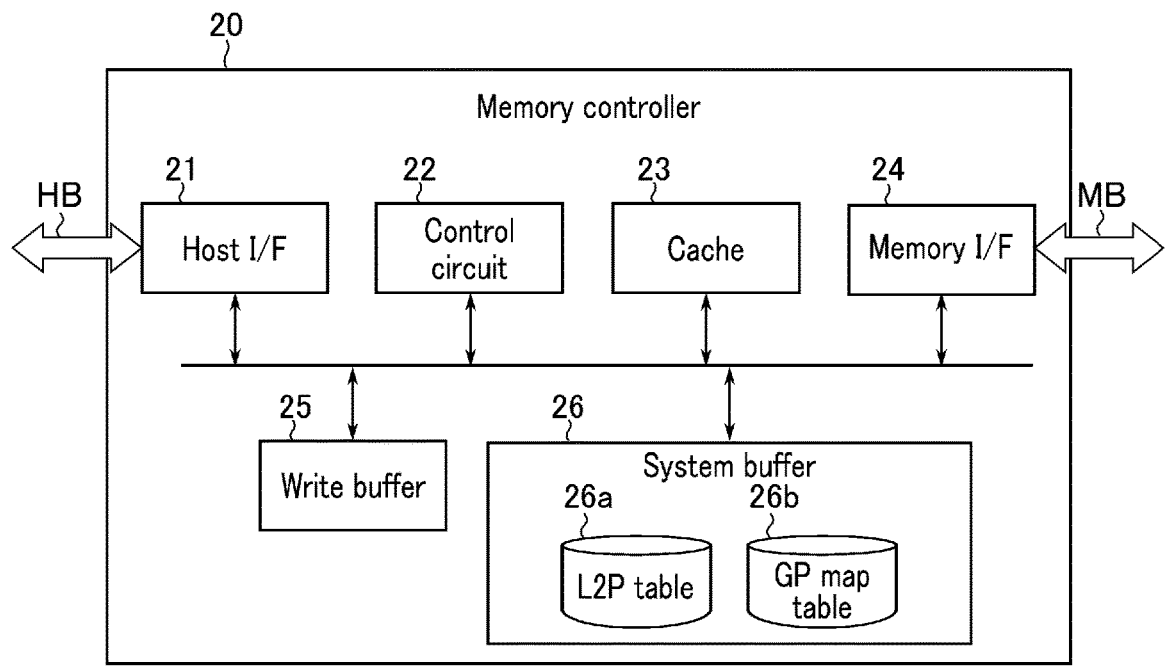
FIG. 5 is a block diagram illustrating an example of an overall configuration of a memory controller according to the first embodiment.

Next, a configuration of the memory controller 20 will be described.
1.1.4.1 Hardware Configuration
(Overall Configuration)
FIG. 5 is a block diagram illustrating an example of an overall configuration of the memory controller according to the first embodiment. The memory controller 20 includes a host interface circuit (host I/F) 21, a control circuit 22, a cache 23, a memory interface circuit (memory I/F) 24, a write buffer 25, and a system buffer 26. The functions of the host interface circuit 21, the control circuit 22, the cache 23, the memory interface circuit 24, the write buffer 25, and the system buffer 26 described below can be implemented by any of dedicated hardware, a processor that executes a program, or a combination thereof.

The host interface circuit 21 is hardware that manages communication between the memory controller 20 and the host 2. The host interface circuit 21 is connected to the host 2 via the host bus HB.

The control circuit 22 is a circuit that controls the entire memory controller 20. The control circuit 22 includes, for example, a processor such as a central processing unit (CPU), a read only memory (ROM), and a random access memory (RAM).

The cache 23 is, for example, a static random access memory (SRAM) or a dynamic random access memory (DRAM). Data having a high access frequency is stored in the cache 23. The write data from the host 2 is first stored in the cache 23 via the host interface circuit 21. The write data stored in the cache 23 is transmitted to the write buffer 25.

The memory interface circuit 24 is hardware that manages communication between the memory controller 20 and the nonvolatile memory 10. The memory interface circuit 24 is connected to the nonvolatile memory 10 via a memory bus MB.

The write buffer 25 is, for example, a DRAM. The write buffer 25 buffers write data between the cache 23 and the memory interface circuit 24.

The system buffer 26 is, for example, a DRAM. The system buffer 26 stores system data. The system data is data for managing the nonvolatile memory 10 and the write buffer 25. The system buffer 26 stores an L2P table 26a and a GP map table 26b as an example of the system data. The L2P table 26a indicates association from a logical address LA to a physical address PA. Details of the data structure of the L2P table 26a will be described later.
(Cache)
FIG. 6 is a block diagram illustrating an example of a hardware configuration of a cache according to the first embodiment. As shown in FIG. 6, the cache 23 includes a plurality of cache lines CL. Each cache line CL includes a plurality of cache units CU each having a storage capacity equivalent to the access granularity. The example of FIG. 6 illustrates a case where the cache line CL includes eight cache units CU0 to CU7. The cache units CU0 to CU7 in the cache line CL are associated with consecutive logical addresses. The data stored in the cache line CL may be intermittently stored in the cache units CU0 to CU7.

The data stored in the cache 23 is evicted in units of cache lines CL. That is, as in the example of FIG. 6, in a case where the cache line CL includes the eight cache units CU0 to CU7, the unit size of the data evicted from the cache 23 is 64B×8=512B. Note that all data to be evicted may not be valid data. That is, the size of the valid data evicted from the cache line CL by one eviction process can be in the range of 64B to 512B.
(Write Buffer)
FIG. 7 is a block diagram illustrating an example of a hardware configuration of the write buffer according to the first embodiment. As shown in FIG. 7, the write buffer 25 includes $2^n$ write buffer units WBU0 to WBU($2^n$−1).

Figure 8:
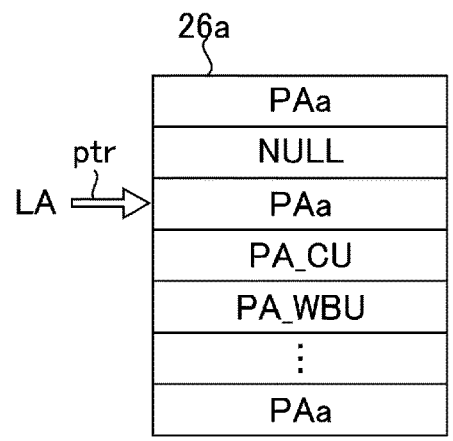
FIG. 8 is a diagram illustrating an example of a data structure of an L2P table according to the first embodiment.

Each of the write buffer units WBU0 to WBU($2^n$−1) has a storage capacity (for example, 4 KB) corresponding to data (write unit) written by one write process. The write buffer units WBU0 to WBU($2^n$−1) are associated with the banks BANK0 to BANK($2^n$−1), respectively. The data buffered in the write buffer units WBU0 to WBU($2^n$−1) is written to the memory cells in the block BLK belonging to the groups GP0 to GP($2^n$−1) via the memory interface circuit 24, respectively.
(L2P Table)
FIG. 8 is a diagram illustrating an example of a data structure of the L2P table according to the first embodiment. As illustrated in FIG. 8, the L2P table 26a includes a plurality of storage areas (entries). The number of entries in the L2P table 26a is determined by the access granularity and the capacity of the memory system 3 which can be seen from the host 2. For example, in a case where the access granularity is 64B (=$2^6$B) and the capacity of the memory system 3 which can be seen from the host 2 is 256 GB (=$2^{38}$B), the L2P table 26a includes 4G (=$2^{32}$) entries. Each of the plurality of entries is uniquely identified by a corresponding logical address LA. That is, each of the plurality of entries is accessed using the corresponding logical address LA as a pointer ptr. Among the plurality of entries, the number of entries associated with the same bank address LAa is the number obtained by dividing the total number of entries by $2^n$. Specifically, in a case where the total number of entries is 4G, the number of entries associated with one bank is $2^{(32-n)}$.

Each of the plurality of entries may store the divided physical address PAa corresponding to a physical memory area in which valid data is stored. In a case where the divided physical address PAa is stored, valid data corresponding to the logical address LA indicating the entry is stored in the nonvolatile memory 10. That is, the L2P table 26a has a data structure in which the divided physical address PAa corresponding to the physical memory area in which the valid data is stored is mapped on the logical address space.

As described above, the memory controller 20 cannot identify the physical memory area in the nonvolatile memory 10 in which the valid data is stored with the access granularity by the divided physical address PAa alone. However, the memory controller 20 can identify the physical memory area in the nonvolatile memory 10 in which the valid data is stored with the access granularity by a combination of the entry position of the GP map table 26b included in the divided physical address PAa and the data position in the block BLK indicated by the entry position in the access granularity.

Each of the plurality of entries may store a physical address PA_WBU indicating a physical memory area in the write buffer unit WBU. In a case where the physical address PA_WBU is stored, valid data corresponding to the logical address LA indicating the entry is stored in the write buffer 25.

Each of the plurality of entries may store a physical address PA_CU indicating a physical memory area in the cache unit CU. In a case where the physical address PA_CU is stored, valid data corresponding to the logical address LA indicating the entry is stored in the cache 23.

The physical address PA may not be stored in each of the plurality of entries. In a case where the physical address PA is not stored, the valid data corresponding to the logical address LA indicating the entry is not stored in the physical memory area in the memory system 3. In the example of FIG. 8, "NULL" is described in the entry in which the physical address PA is not stored.

1.1.4.2 Function Configuration

Figure 9:
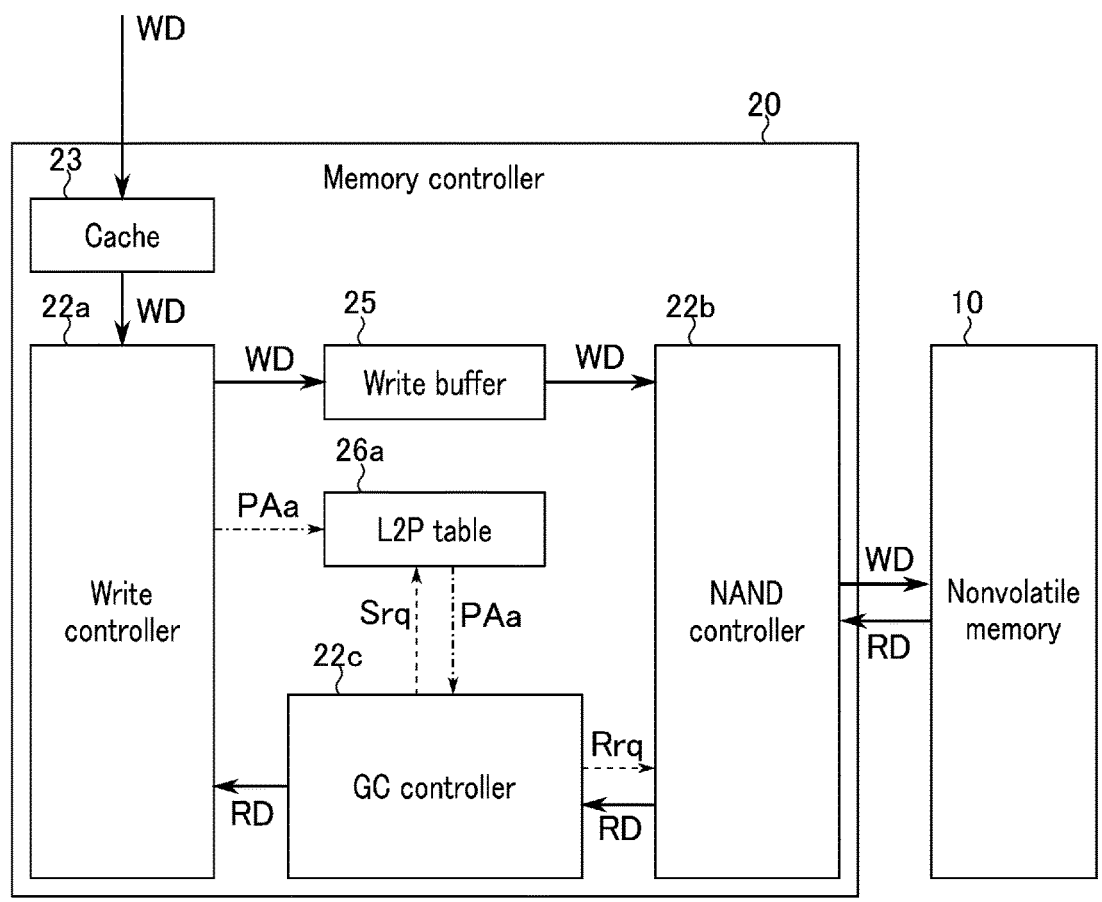
FIG. 9 is a block diagram illustrating an example of a function configuration of the memory controller according to the first embodiment.

FIG. 9 is a block diagram illustrating an example of a function configuration of the memory controller according to the first embodiment. FIG. 9 illustrates a function configuration of the memory controller 20 mainly related to a write process and a GC process. The control circuit 22 functions as, for example, a write controller 22a, a NAND controller 22b, and a GC controller 22c with respect to the write process and the GC process.

First, a function configuration related to the write process will be described.

When receiving the write data WD from the cache 23, the write controller 22a determines a physical memory area of the nonvolatile memory 10 to which write data WD is to be written. The write controller 22a generates the divided physical address PAa from the physical address PA corresponding to the determined physical memory area based on the bank address LAa in the logical address LA corresponding to the write data WD, and stores the divided physical address PAa in the L2P table 26a. In addition, the write controller 22a buffers the write data WD in the write buffer unit WBU associated with the corresponding bank BANK.

When receiving the write data WD from the write buffer 25, the NAND controller 22b writes the write data WD to the physical memory area in the nonvolatile memory 10.

Note that the L2P table 26a is updated each time, for example, based on at which position in which memory of the cache 23, the write buffer 25, and the nonvolatile memory 10 the write data WD is stored. In addition, the group GP and a set of block addresses indicating the block BLK belonging to the group GP are stored in the GP map table 26b, in association with each other.

The main function configuration regarding the write process of the memory controller 20 is as described above.

Next, a function configuration related to the GC process will be described.

The GC controller 22c manages the number of valid data for a plurality of blocks BLK in the nonvolatile memory 10. In a case where the block BLK in which the number of valid data is equal to or less than a threshold value is generated, the GC controller 22c starts execution of the GC process for the block BLK. Specifically, the GC controller 22c identifies the bank BANK corresponding to the group GP to which the block BLK to be GC processed belongs. The GC controller 22c selectively scans a plurality of entries designated by the bank address LAa corresponding to the identified bank BANK in the L2P table 26a using a scan signal Srq. As a result of the scan, the GC controller 22c acquires the divided physical address PAa of the valid data stored in the block BLK to be GC processed. The GC controller 22c issues a read request Rrq for the acquired divided physical address PAa and the physical memory area identified by the and bank address LAa.

When receiving the read request Rrq, the NAND controller 22b executes a read process, and reads valid data stored in the block BLK to be GC processed from the nonvolatile memory 10 as read data RD. The read data RD is transmitted from the NAND controller 22b to the write controller 22a via the GC controller 22c.

Upon receiving the read data RD, the write controller 22a executes a write back process of writing the read data RD back as the write data WD to the block BLK that belongs to the same group GP and is being write updated. The details of the write back process are the same as those of the write process described above, and thus the description thereof will be omitted.

Note that prior to the write back process, the memory controller 20 allocates the free block BLK from the group GP_FB to the group GP to be GC processed so that the blocks BLK to which data can be written are not exhausted in the group GP to which the block BLK to be GC processed belongs. In addition, the memory controller 20 allocates the block BLK to be GC processed as the free block BLK to the group GP_FB, and then allocates a new free block BLK from the group GP_FB to the group GP to be GC processed.

The main function configuration related to the GC process of the memory controller 20 is as described above.

1.2 Operation

Next, an operation in the memory system according to the first embodiment will be described.

1.2.1 GC Process

Figure 10:
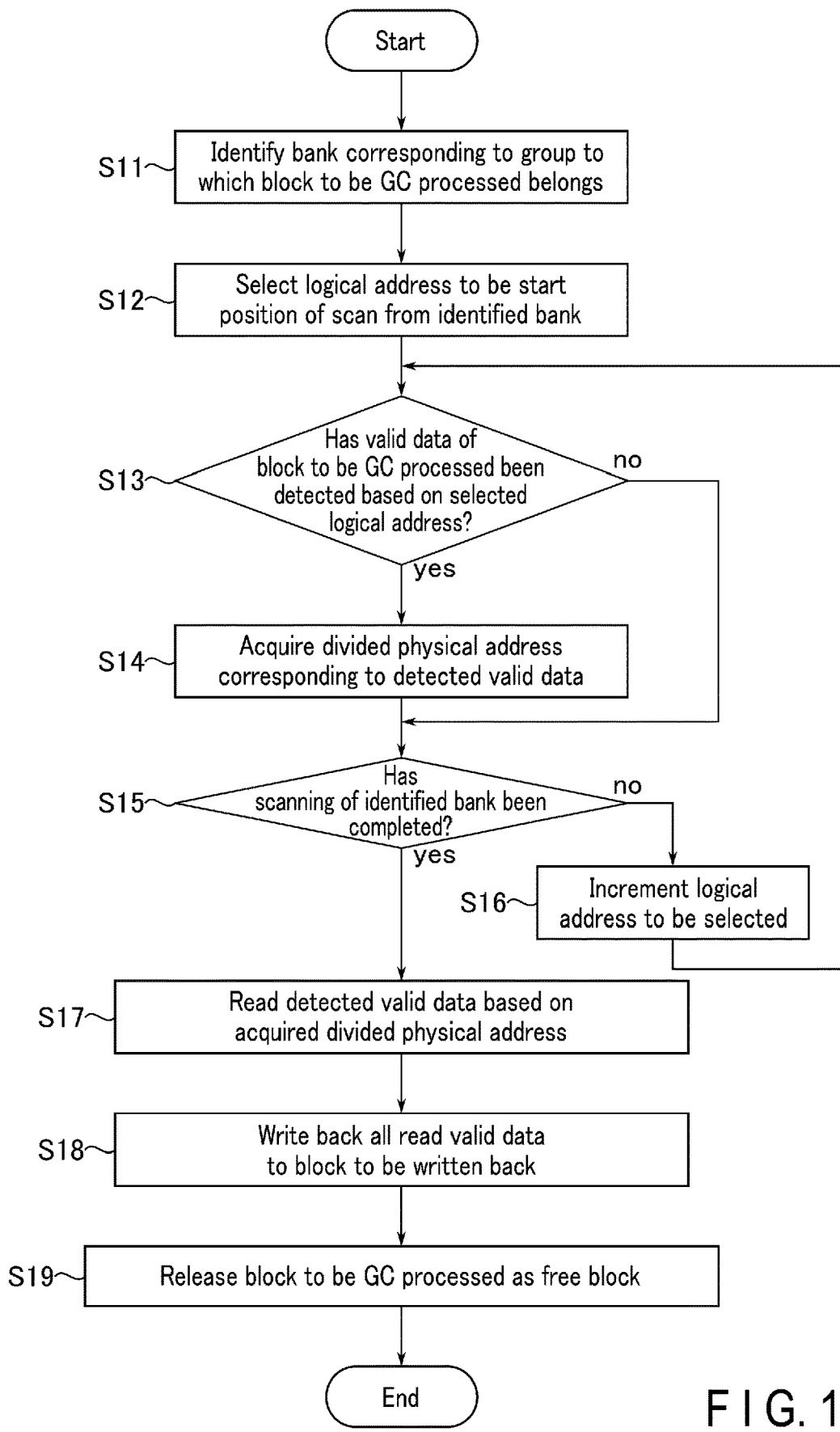
FIG. 10 is a flowchart illustrating an example of a GC process in the memory system according to the first embodiment.

FIG. 10 is a flowchart illustrating an example of the GC process in the memory system according to the first embodiment. In the GC process shown in FIG. 10, it is assumed that the writable free block BLK is allocated from the group GP_FB to the group GP to which the block BLK to be GC processed belongs.

When the block BLK in which the number of valid data is equal to or less than a threshold value is generated (start), the GC controller 22c regards the block BLK as the block BLK to be GC processed and identifies the bank BANK corresponding to the group GP to which the block BLK to be GC processed belongs (S11).

The GC controller 22c selects the logical address LA, which is the start position of the scan, from the bank BANK identified in the process of S11 (S12). As the start position of the scan, for example, the lowermost or uppermost address of the logical address LA including the bank address LAa corresponding to the identified bank BANK is selected.

The GC controller 22c determines whether valid data of the block BLK to be GC processed has been detected based on the logical address LA selected in the process of S12 (S13). Specifically, the GC controller 22c refers to the L2P table 26a using the logical address LA selected in the process of S12. Then, the GC controller 22c determines whether the divided physical address PAa corresponding to the block BLK to be GC processed is stored in the reference destination entry, thereby determining whether valid data of the block BLK to be GC processed is detected.

In a case where valid data of the block BLK to be GC processed is detected (S13; yes), the GC controller 22c acquires the divided physical address PAa corresponding to the detected valid data from the L2P table 26a (S14).

In a case where valid data of the block BLK to be GC processed has not been detected (S13; no), or after the process of S14, the GC controller 22c determines whether scanning of the bank BANK identified in the process of S11 is completed (S15).

In a case where the scanning of the bank BANK identified in the process of S11 is not completed (S15; no), the GC controller 22c increments the logical address to be selected (S16).

After the process of S16, the GC controller 22c determines whether valid data of the block BLK to be GC processed is detected based on the logical address selected in the process of S16 (S13). Then, the subsequent processing of S14 to S16 is executed. As a result, the processes of S13 to S16 are repeated until the scanning of the bank BANK identified in the process of S11 is completed.

In a case where the scanning of the bank BANK identified in the process of S11 is completed (S15; yes), the NAND controller 22b reads the valid data detected in the process of S14 from the block BLK to be GC processed based on the divided physical address PAa acquired in the process of S13 (S17).

After the process of S17, the NAND controller 22b writes back all the valid data read in the process of S17 to one block BLK to be written back in the group GP to which the block BLK to be GC processed belongs (S18).

After the process of S18, the memory controller 20 releases the block BLK to be GC processed as a free block BLK (S19). Then, the block BLK to be GC processed is allocated to the group GP_FB. In addition, the memory controller 20 allocates a new writable free block BLK to the group GP to which the block BLK to be GC processed belongs.

When the process of S19 ends, the GC process ends (ends).

1.3 Effects According to First Embodiment

According to the first embodiment, the memory controller 20 divides the logical address space into a plurality of banks BANK. The memory controller 20 exclusively manages the block BLK associated with each of the plurality of banks BANK. In the GC process, the GC controller 22c selectively scans a portion related to one bank BANK associated with the block BLK to be GC processed in the L2P table 26a. As a result of the scan, the GC controller 22c detects the divided physical address PAa corresponding to the physical memory area in which the valid data is stored in the block BLK to be GC processed. The NAND controller 22b reads valid data stored in the block BLK to be GC processed based on the detected divided physical address PAa. The write controller 22a and the NAND controller 22b write back the read valid data to the free block BLK belonging to the same group GP as the block BLK to be GC processed. As a result, the block BLK in which valid data is fragmentary stored by random write in the low access granularity can be converted in the free block BLK. Therefore, it is possible to suppress a decrease in the physical memory area in which data can be written.

In addition, the memory controller 20 can execute the GC process while limiting the range of scanning to a portion related to one bank BANK in the L2P table 26a. Therefore, the scan range can be narrowed to $1/2^n$ as compared with the case of scanning the entire L2P table 26a. Therefore, an access load to the L2P table 26a can be reduced.

Note that the L2P table 26a has a data structure in which a physical address corresponding to a physical memory area in which valid data is stored is mapped on a logical address space. That is, the memory system 3 can execute the GC process without using the data structure (P2L table) in which the logical address corresponding to the valid data is mapped on the physical address space. Therefore, according to the first embodiment, the memory system 3 does not need to store the P2L table in the nonvolatile memory 10, for example. Therefore, the write amplification (WAF), which is an index indicating the write efficiency to the nonvolatile memory 10, can be improved as compared with the case where the P2L table is stored in the nonvolatile memory 10.

2. Second Embodiment

Next, a memory system according to a second embodiment will be described. The second embodiment is different from the first embodiment in that a defragmenting process is performed together with the GC process. In the following description, configurations and operations different from those of the first embodiment will be mainly described. Description of configurations and operations equivalent to those of the first embodiment will be omitted as appropriate.

2.1 Logical Address

Figure 11:
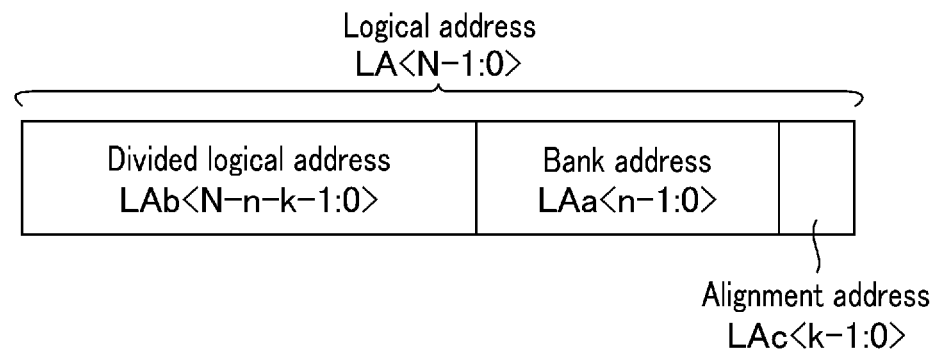
FIG. 11 is a diagram illustrating an example of a configuration of a logical address used in a memory system according to a second embodiment.

FIG. 11 is a diagram illustrating an example of a configuration of a logical address used in the memory system according to the second embodiment. FIG. 11 corresponds to FIG. 3 in the first embodiment. As illustrated in FIG. 11, in the second embodiment, the memory system 3 divides the N-bit logical address LA <N-1:0> into an n-bit bank address LAa <n-1:0>, a k-bit alignment address LAc <k-1:0>, and an (N-n-k-1)-bit divided logical address LAb <N-n-k-1:0>.

The alignment address LAc indicates the order of the plurality of consecutive 64B data in a case where an access (sequential access) to the plurality of consecutive 64B data occurs. By explicitly dividing the alignment address LAc from the bank address LAa and a divided logical address LAb, the memory system 3 can associate a plurality of consecutive 64B data with one bank BANK. Therefore, the memory system 3 can store a plurality of consecutive 64B data in one group GP.

Hereinafter, in a case where there is valid data continuous with certain valid data (target valid data) of the access granularity, the valid data continuous with the target valid data is referred to as "alignment data" of the target data. The alignment data of the target valid data is stored in the group GP associated with the same bank BANK as the target valid data. However, the alignment data of the target valid data may be stored in a block BLK different from the block BLK in which the target valid data is stored.

2.2 Function Configuration of Memory Controller

Figure 12:
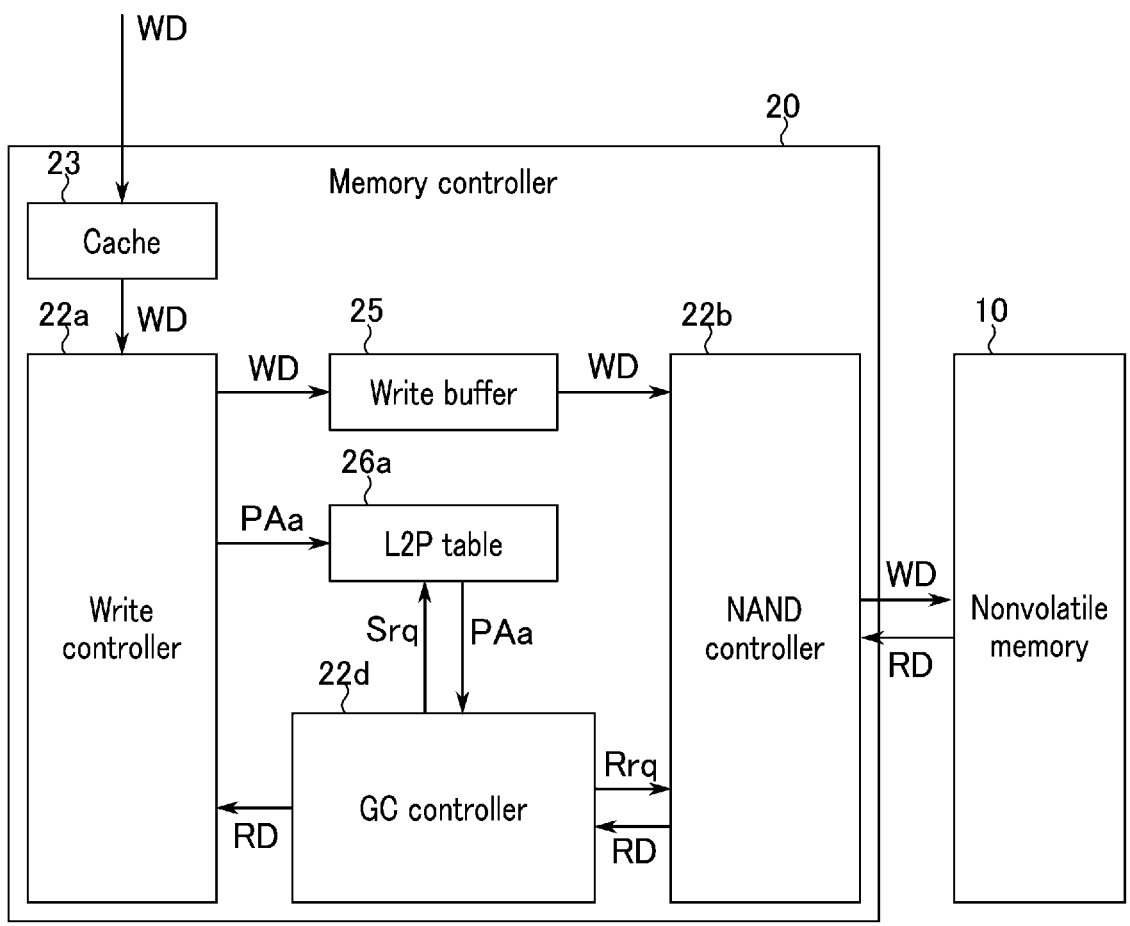
FIG. 12 is a block diagram illustrating an example of a function configuration of the memory system according to the second embodiment.

FIG. 12 is a block diagram illustrating an example of a function configuration of a memory controller according to the second embodiment. FIG. 12 corresponds to FIG. 9 in the first embodiment. The control circuit 22 functions as, for example, a write controller 22a, a NAND controller 22b, and a GC controller 22d with respect to the write process and the GC process.

Since the function configuration related to the write process is equivalent to that of the first embodiment, the description thereof will be omitted.

A function configuration related to the GC process will be described.

The GC controller 22d manages the number of valid data for a plurality of blocks BLK in the nonvolatile memory 10. In a case where the block BLK in which the number of valid data is equal to or less than a threshold value is generated, the GC controller 22d starts execution of the GC process for the block BLK. Specifically, the GC controller 22d identifies the bank BANK corresponding to the group GP to which the block BLK to be GC processed belongs. The GC controller 22d selectively scans a plurality of entries designated by a bank address LAa corresponding to the identified bank BANK in the L2P table 26a using the scan signal Srq. As a result of the scan, the GC controller 22d acquires the divided physical address PAa of the target valid data stored in the block BLK to be GC processed. In addition, the GC controller 22d further acquires the divided physical address PAa of the alignment data of the target valid data stored in the block BLK to be GC processed. The GC controller 22d issues a read request Rrq for the acquired divided physical address PAa and the physical memory area identified by the and bank address LAa.

When receiving the read request Rrq, the NAND controller 22b executes the read process, and reads the target valid data and the alignment data stored in the block BLK to be GC processed from the nonvolatile memory 10 as the read data RD. The read data RD is transmitted from the NAND controller 22b to the write controller 22a via the GC controller 22d.

Upon receiving the read data RD, the write controller 22a executes a write back process of writing the read data RD back as the write data WD to the block BLK that belongs to the same group GP and is being write updated. In the write back process, the target valid data and the alignment data stored in the block BLK to be GC processed are redisposed in the alignment order based on the alignment address LAc. The details of the write back process are the same as those of the write process described above, and thus the description thereof will be omitted.

Note that prior to the write back process, the memory controller 20 allocates the free block BLK from the group GP_FB to the group GP to be GC processed so that the blocks BLK to which data can be written are not exhausted in the group GP to which the block BLK to be GC processed belongs. In addition, the memory controller 20 allocates the block BLK to be GC processed as the free block BLK to the group GP_FB, and then allocates a new free block BLK from the group GP_FB to the group GP to be GC processed.

The main function configuration related to the GC process of the memory controller 20 is as described above.

2.3 GC Process

Figure 13:
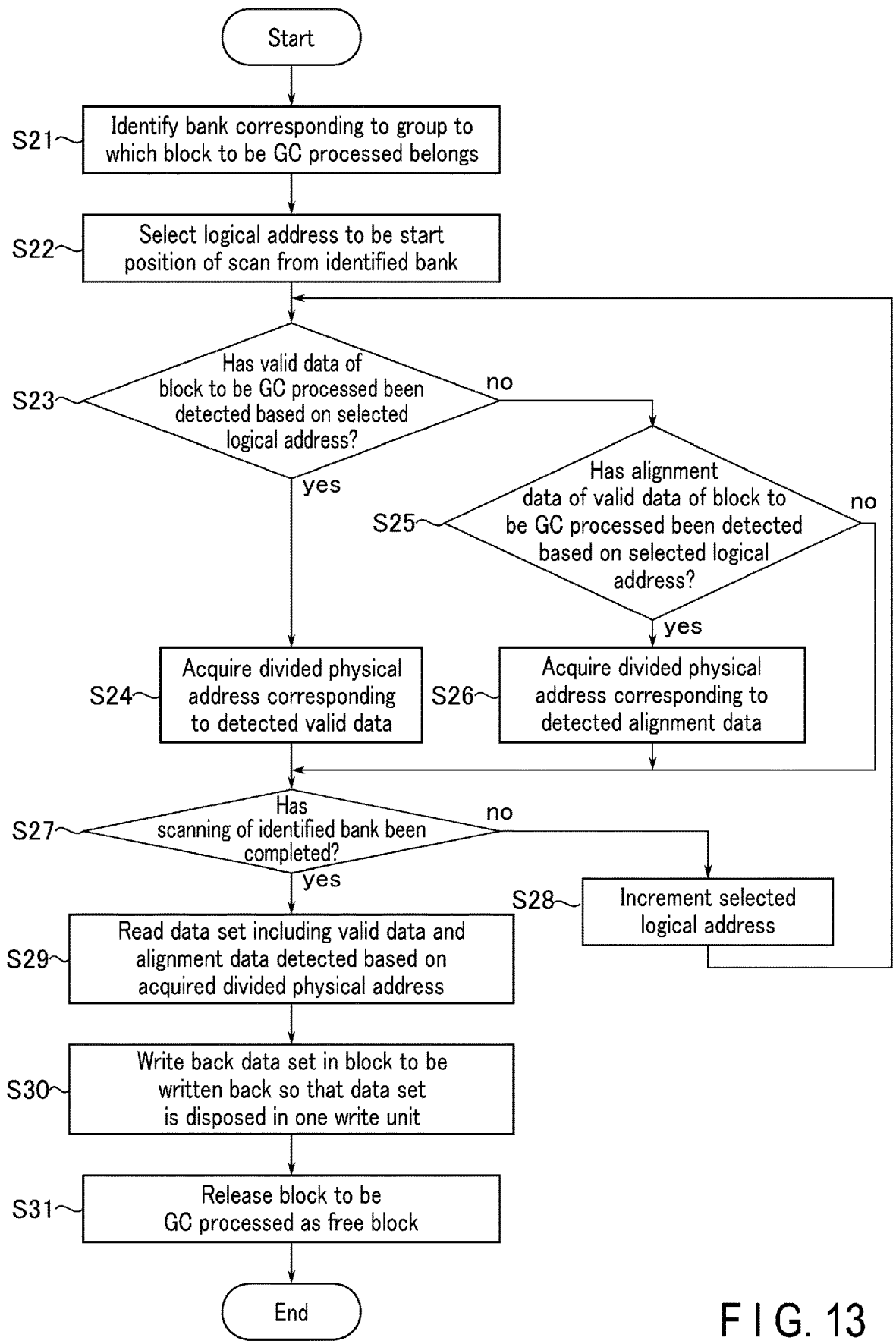
FIG. 13 is a flowchart illustrating an example of a GC process in the memory system according to the second embodiment.

FIG. 13 is a flowchart illustrating an example of the GC process in the memory system according to the second embodiment. FIG. 13 corresponds to FIG. 10 in the first embodiment.

When the block BLK in which the number of valid data is equal to or less than the threshold value is generated (start), the GC controller 22d regards the block BLK as the block BLK to be GC processed and identifies the bank BANK corresponding to the group GP to which the block BLK to be GC processed belongs (S21).

The GC controller 22d selects the logical address LA, which is the start position of the scan, from the bank BANK identified in the process of S21 (S22). As the start position of the scan, for example, the lowermost or uppermost address of the logical address LA including the bank address LAa corresponding to the identified bank BANK is selected.

The GC controller 22d determines whether the target valid data of the block BLK to be GC processed is detected based on the logical address LA selected in the process of S22 (S23). Specifically, the GC controller 22d refers to the L2P table 26a using the logical address LA selected in the process of S22. Then, the GC controller 22d determines whether the divided physical address PAa corresponding to the block BLK to be GC processed is stored in the reference destination entry, thereby determining whether the target valid data of the block BLK to be GC processed is detected.

In a case where the target valid data of the block BLK to be GC processed is detected (S23; yes), the GC controller 22d acquires the divided physical address PAa corresponding to the detected target valid data from the L2P table 26a (S24).

In a case where the target valid data of the block BLK to be GC processed is not detected (S23; no), the GC controller 22d determines whether the alignment data of the target valid data of the block BLK to be GC processed is detected based on the logical address LA selected in the process of S22 (S25). Specifically, the GC controller 22d refers to the L2P table 26a using the logical address LA including the alignment address LAc continuous with the alignment address LAc in the logical address LA selected in the process of S22. Then, the GC controller 22d determines whether the alignment data is stored in the reference destination entry, thereby determining whether the alignment data of the target valid data of the block BLK to be GC processed is detected.

In a case where the alignment data of the target valid data of the block BLK to be GC processed is detected (S25; yes), the GC controller 22d acquires the divided physical address PAa corresponding to the detected alignment data from the L2P table 26a (S26).

In a case where the alignment data of the target valid data of the block BLK to be GC processed is not detected (S25; no), after the process of S24, or the process of S26, the GC controller 22d determines whether the scanning of the bank BANK identified in the process of S21 is completed (S27).

In a case where the scanning of the bank BANK identified in the process of S21 is not completed (S27; no), the GC controller 22d increments the logical address to be selected (S28).

After the process of S28, the GC controller 22d determines whether the target valid data of the block BLK to be GC processed is detected based on the logical address selected in the process of S28 (S23). Then, the subsequent processing of S24 to S28 is executed. As a result, the processes of S23 to S28 are repeated until the scanning of the bank BANK identified in the process of S21 is completed.

In a case where the scanning of the bank BANK identified in the process of S21 is completed (S27; yes), the NAND controller 22b reads the data set including the target valid data detected in the process of S23 and the alignment data detected in the process of S25 from the group GP corresponding to the bank BANK identified in the process of S21 based on the divided physical addresses PAa acquired in the process of S24 and the process of S26 (S29).

After the process of S29, the NAND controller 22b writes back the data set read in the process of S29 in the block BLK to be written back in the group GP to which the block BLK to be GC processed belongs so that the data set is disposed in one write unit (S30). As a result, the target valid data in the block BLK to be GC processed stored fragmentary in the group GP and the alignment data of the target valid data are aggregated into one block BLK. That is, the defragmentation process is further executed in addition to the GC process.

After the process of S30, the memory controller 20 releases the block BLK to be GC processed as a free block BLK (S31). Then, the block BLK to be GC processed is allocated to the group GP_FB. In addition, the memory controller 20 allocates a new writable free block BLK to the group GP to which the block BLK to be GC processed belongs.

When the process of S31 ends, the GC process ends (ends).

2.4 Effects According to Second Embodiment

According to the second embodiment, the memory controller 20 divides the logical address LA into the bank address LAa, the divided logical address LAb, and the alignment address LAc. As a result, the memory controller 20 can associate a plurality of consecutive 64B data with the same bank BANK. As a result, the GC controller 22d can detect the alignment data of the target valid data in the block BLK to be GC processed by selectively scanning one bank BANK in the L2P table 26a executed at the time of the GC process. Therefore, the GC controller 22d can execute the defragmentation process in addition to the GC process. Therefore, as in the first embodiment, it is possible to aggregate fragmented data into one free block BLK while suppressing an access load on the L2P table 26a.

3. Modifications

Various modifications can be applied to the above-described embodiments.

In the second embodiment described above, the case where the defragmentation process is unconditionally executed in a case where the alignment data exists is described, but the present invention is not limited thereto. For example, it may be determined whether to execute the defragmentation process. Hereinafter, configurations and operations different from those of the second embodiment will be mainly described. Description of configurations and operations equivalent to those of the second embodiment will be omitted as appropriate.

3.1 GC Process

Figure 14:
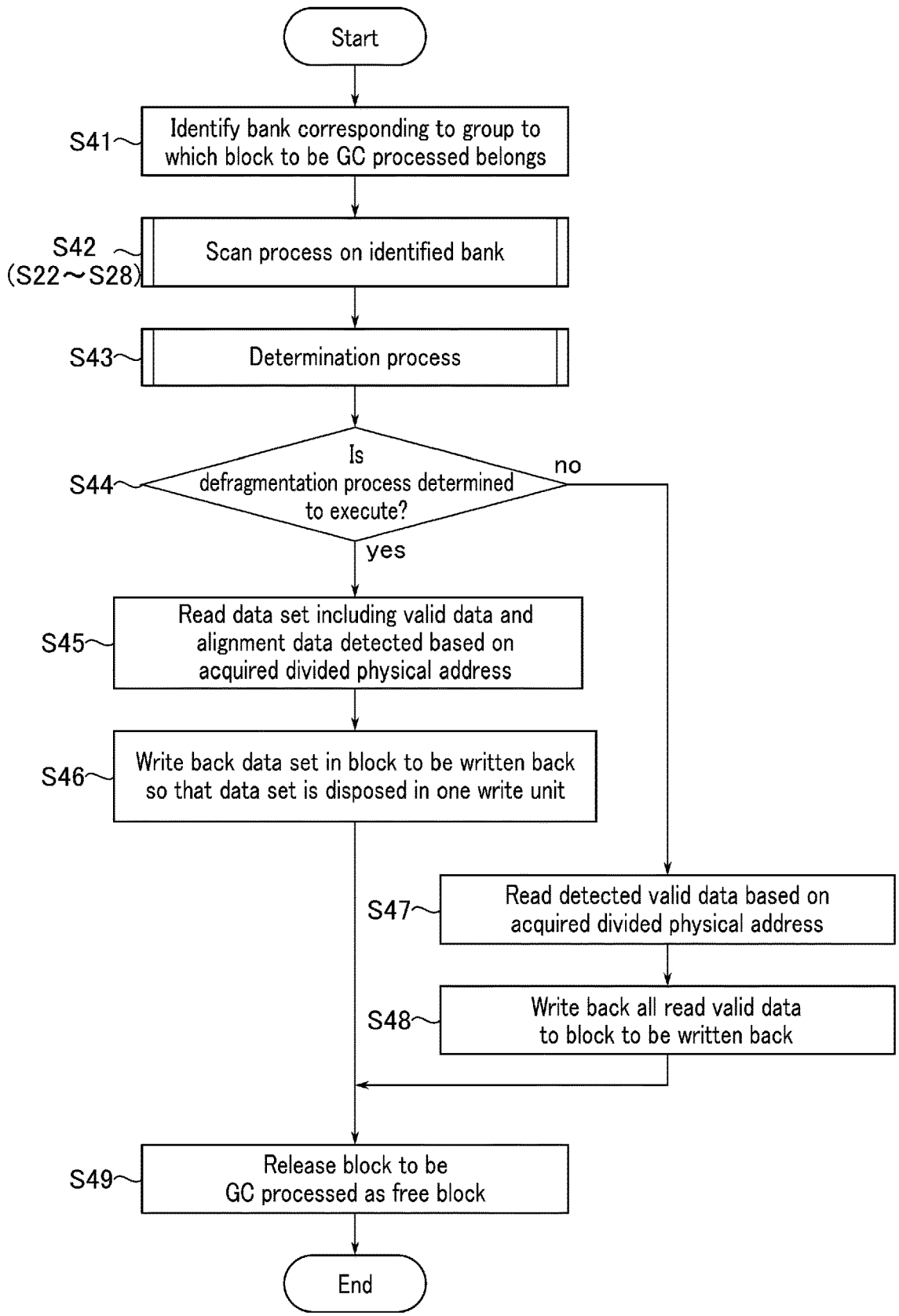
FIG. 14 is a flowchart illustrating an example of a GC process in a memory system according to a modification of the second embodiment.

FIG. 14 is a flowchart illustrating an example of the GC process in the memory system according to the modification. FIG. 14 corresponds to FIG. 13 in the second embodiment.

When the block BLK in which the number of valid data is equal to or less than the threshold value is generated (start), the GC controller 22d regards the block BLK as the block BLK to be GC processed and identifies the bank BANK corresponding to the group GP to which the block BLK to be GC processed belongs (S41).

The GC controller 22d executes a scan process for the bank BANK identified in the process of S41 (S42). The processing of S42 is equivalent to the processing of S22 to S28 in FIG. 13. As a result, the GC controller 22d acquires the divided physical address PAa in which the valid data in the block BLK to be GC processed is stored and the divided physical address PAa in which the alignment data of the valid data is stored.

After the process of S42, the GC controller 22d executes a determination process (S43). The GC controller 22d determines whether to execute the defragmentation process by the determination process. Details of the determination process will be described later.

In a case where it is determined that the defragmentation process is to be executed (S44; yes), the NAND controller 22b reads the data set including the valid data in the block BLK to be GC processed and the alignment data of the valid data from the group GP corresponding to the bank BANK identified in the process of S43 based on the divided physical address PAa acquired in the process of S41 (S45).

After the process of S45, the NAND controller 22b writes back the data set read in the process of S45 in the block BLK to be written back in the group GP to which the block BLK to be GC processed belongs so that the data set is disposed in one write unit (S46). As a result, the valid data in the block BLK to be GC processed stored fragmentary in the group GP and the alignment data of the valid data are aggregated into one block BLK. That is, the defragmentation process is further executed in addition to the GC process.

In a case where it is determined that the defragmentation process is not executed (S44; no), the NAND controller 22b reads valid data in the block BLK to be GC processed from the group GP corresponding to the bank BANK identified in the process of S43 based on the divided physical address PAa acquired in the process of S41 (S47).

After the process of S47, the NAND controller 22b writes back all the valid data read in the process of S47 to the block BLK to be written back in the group GP to which the block BLK to be GC processed belongs (S48). That is, the defragmentation process is not executed in addition to the GC process.

After the process of S46 or after the process of S48, the memory controller 20 releases the block BLK to be GC processed as a free block BLK (S49). Then, the block BLK to be GC processed is allocated to the group GP_FB. In addition, the memory controller 20 allocates a new writable free block BLK to the group GP to which the block BLK to be GC processed belongs.

When the process of S49 ends, the GC process ends (ends).

3.2 Determination Process

Next, details of the determination process will be described. Examples of the determination process include the following three examples.

3.2.1 First Example

Figure 15:
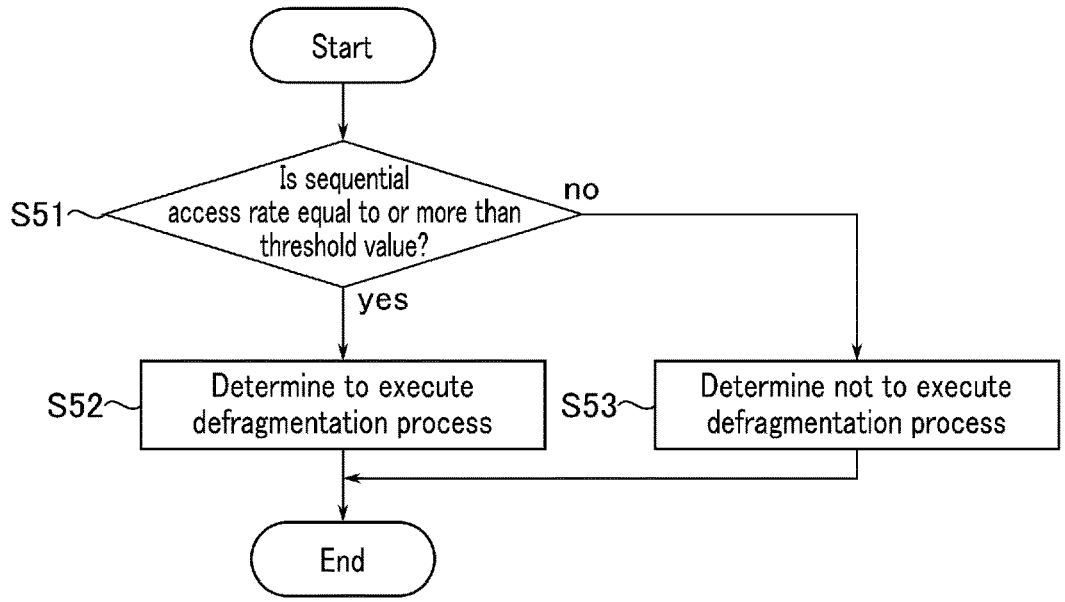
FIG. 15 is a flowchart illustrating a first example of a determination process in the memory system according to the modification of the second embodiment.

FIG. 15 is a flowchart illustrating a first example of the determination process in the memory system according to the modification. In the first example, whether to perform the defragmentation process is determined based on the ratio of sequential accesses (sequential access rate) in the access from the host 2.

When the determination process is started (start), the GC controller 22d determines whether the sequential access rate is equal to or more than a threshold value (S51).

In a case where the sequential access rate is equal to or more than the threshold value (S51; yes), the GC controller 22d determines to execute the defragmentation process (S52).

In a case where the sequential access rate is less than the threshold value (S51; no), the GC controller 22d determines not to execute the defragmentation process (S53).

After the process of S52 or the process of S53, the determination process ends (ends).

3.2.2 Second Example

Figure 16:
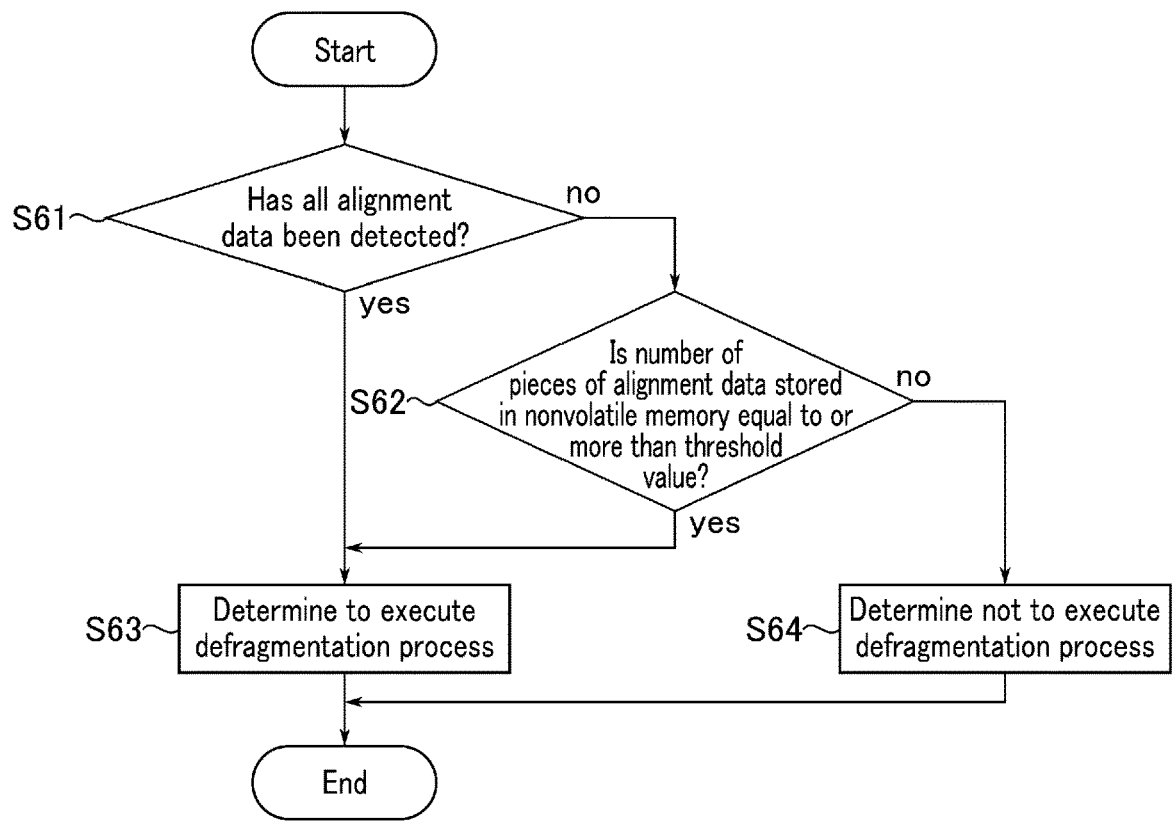
FIG. 16 is a flowchart illustrating a second example of the determination process in the memory system according to the modification of the second embodiment.

FIG. 16 is a flowchart illustrating a second example of the determination process in the memory system according to the modification. In the second example, it is determined whether the defragmentation process can be performed based on the number of pieces of alignment data stored in the nonvolatile memory 10.

When the determination process is started (start), the GC controller 22d determines whether all the alignment data has been detected (S61).

In a case where undetected alignment data exists (S61; no), the GC controller 22d determines whether the number of pieces of alignment data stored in the nonvolatile memory 10 is equal to or more than a threshold value (S62). For example, a value such as 80% of the total number of pieces of alignment data that stored in the nonvolatile memory 10 is applied as the threshold value in the process of S62. Note that, in a case where the alignment data is stored in the cache 23 and the write buffer 25, the threshold value is applied after the number of pieces of alignment data is excluded from the total number of pieces of the alignment data that stored in the nonvolatile memory 10.

In a case where all the alignment data are detected (S61; yes), or in a case where the number of pieces of alignment data stored in the nonvolatile memory 10 is equal to or more than the threshold value (S62; yes), the GC controller 22d determines to execute the defragmentation process (S63).

In a case where the number of pieces of alignment data stored in the nonvolatile memory 10 is less than the threshold value (S62; no), the GC controller 22d determines not to execute the defragmentation process (S64).

After the process of S63 or the process of S64, the determination process ends (ends).

3.2.3 Third Example

FIG. 17 is a flowchart illustrating a third example of the determination process in the memory system according to the modification. In the third example, it is determined whether to perform the defragmentation process based on the relationship between the number of valid data in the block BLK to be GC processed and the number of pieces of alignment data outside the block BLK to be GC processed.

When the determination process is started (start), the GC controller 22d determines whether the number of valid data in the detected block BLK to be GC processed is more than the number of pieces of alignment data outside the block BLK to be GC processed (S71).

In a case where the number of valid data in the block BLK to be GC processed is equal to or less than the number of pieces of alignment data outside the block BLK to be GC processed (S71; no), the GC controller 22d calculates in how many blocks BLK the detection alignment data is distributed and stored. Then, the GC controller 22d determines whether the calculated number of blocks BLK is equal to or more than a threshold value (S72).

In a case where the number of valid data in the block BLK to be GC processed is more than the number of pieces of alignment data outside the block BLK to be GC processed (S71; yes), or in a case where the number of blocks BLK in which the alignment data is stored is equal to or more than the threshold value (S72; yes), the GC controller 22d determines to execute the defragmentation process (S73).

In a case where the number of blocks BLK in which the alignment data is stored is less than the threshold value (step S72; no), the GC controller 22d determines not to execute the defragmentation process (S74).

After the process of S73 or the process of S74, the determination process ends (ends).

3.3 Effects According to Modifications

According to the modification, the GC controller 22d determines whether to perform the defragmentation process in the GC process. Accordingly, it is possible to avoid excessive execution of the defragmentation process. Therefore, deterioration of the WAF can be suppressed, and compression of the communication band with the nonvolatile memory 10 can be suppressed.

Specifically, for example, in a case where the sequential access ratio is high, data fragmentation is less likely to occur, and thus the degree of request for the defragmentation process is relatively low. According to the first modification, the GC controller 22d determines whether the defragmentation process can be performed based on the sequential access ratio. As a result, in a case where the random access ratio at which data fragmentation is likely to occur is high, the defragmentation process can be executed in a concentrated manner.

Furthermore, for example, not all the alignment data is stored in the memory system 3. In a case where the number of pieces of alignment data stored in the memory system 3 is small, the degree of request for the defragmentation process is relatively low. According to the second modification, the GC controller 22d determines whether the defragmentation process can be performed based on the number of pieces of alignment data stored in the nonvolatile memory 10. As a result, in a case where there is the alignment data to some extent, the defragmentation process can be executed in a concentrated manner.

In addition, for example, it may be more efficient to execute the defragmentation process in a case where another block BLK is the block BLK to be GC processed than to execute the defragmentation process in a case where a certain block BLK is the block BLK to be GC processed. According to the third modification, the GC controller 22d determines whether the defragmentation process can be performed based on the magnitude relationship between the number of pieces of target valid data and the number of pieces of alignment data. As a result, it is possible to appropriately select a GC process that is efficient when executing the defragmentation process together.

Note that, even in a case where the number of pieces of alignment data is more than the number of pieces of target valid data, it may be better to execute the defragmentation process in a case where the alignment data is distributed to a large number of blocks BLK. According to the third modification, the GC controller 22d determines to execute the defragmentation process in a case where the number of pieces of alignment data is more than the number of pieces of target valid data and the number of blocks BLK in which the alignment data is stored exceeds a threshold value. As a result, a state in which the alignment data is extremely fragmented can be detected, and the aggregation of the valid data can be appropriately executed.

While certain embodiments have been described, these embodiments have been presented by way of example only, and are not intended to limit the scope of the invention. Indeed, the embodiments described herein may be embodied in a variety of other forms; furthermore, various omissions, substitutions and changes in the form of the embodiments described herein may be made without departing from the spirit of the inventions. The embodiments and modifications are included in the scope and spirit of the invention and are included in the scope of the claimed inventions and their equivalents.

What is claimed is:

1. A memory system comprising:
a nonvolatile memory including a plurality of blocks each of which includes a plurality of physical memory areas; and
a memory controller configured to divide a logical address space into a plurality of banks and associate a block with each of the plurality of banks,
wherein the memory controller is configured to:
identify a first bank among the plurality of banks;
selectively scan a portion related to the first bank in a table in which a physical address corresponding to a physical memory area in which valid data is stored is mapped on the logical address space;
detect a first physical address corresponding to a first physical memory area in a first block associated with the first bank as a result of the scan;
read first valid data stored in the first block based on the first physical address;
write the first valid data in a second block associated with the first bank,
detect a second physical address corresponding to a second physical memory area in one or a plurality of third blocks associated with the first bank as a result of the scan, the third block being different from the first block;
read second valid data stored in the third block based on the second physical address; and
write the second valid data together with the first valid data in the second block.

2. The memory system according to claim 1, wherein the memory controller is configured to cancel an association between the first block and the first bank after the first valid data is written in the second block.

3. The memory system according to claim 2, wherein the memory controller is configured to release the first block as a first free block after the first valid data is written in the second block.

4. The memory system according to claim 3, wherein the memory controller is configured to associate a second free block with the first bank.

5. The memory system according to claim 1, wherein the memory controller is configured to identify a bank to which a block whose number of valid data is equal to or less than a threshold value belongs as a bank that executes the scan.

6. The memory system according to claim 1, wherein the memory controller is configured to:
divide the logical address space in a plurality of alignment orders independently of the plurality of banks; and
write the first valid data and the second valid data in the second block in a state where the first valid data and the second valid data are redisposed in the alignment orders.

7. The memory system according to claim 6, wherein the memory controller is configured to determine whether to execute reading of the second valid data and writing of the second valid data together with the first valid data to the second block.

8. The memory system according to claim 7, wherein, in a case where a ratio of sequential accesses in accesses from a host is equal to or more than a threshold value, the memory controller is configured to read the second valid data and write the second valid data together with the first valid data to the second block.

9. The memory system according to claim 7, wherein, in a case where the second physical addresses whose number is equal to or more than a threshold value is detected, the memory controller is configured to:
read the second valid data; and
write the second valid data together with the first valid data in the second block.

10. The memory system according to claim 9, wherein, in a case where second physical addresses corresponding to all alignment orders are detected, the memory controller is configured to:
read the second valid data; and
write the second valid data together with the first valid data in the second block.

11. The memory system according to claim 7, wherein, in a case where a number of the detected first physical addresses is more than a number of the detected second physical addresses, the memory controller is configured to:
read the second valid data; and
write the second valid data together with the first valid data in the second block.

12. The memory system according to claim 7, wherein, in a case where a number of the detected first physical addresses is equal to or less than a number of the detected second physical addresses and a number of the third blocks is equal to or more than a threshold value, the memory controller is configured to:
read the second valid data; and
write the second valid data together with the first valid data in the second block.

13. A memory system comprising:
a nonvolatile memory including a plurality of blocks each of which includes a plurality of physical memory areas;
a memory controller configured to divide a logical address space into a plurality of banks and associate a block with each of the plurality of banks, and
a buffer including a plurality of buffer units each of which includes a plurality of physical memory areas and that are associated with the plurality of respective banks, wherein
the memory controller is configured to:
identify a first bank among the plurality of banks;
selectively scan a portion related to the first bank in a table in which a physical address corresponding to a physical memory area in which valid data is stored is mapped on the logical address space;
detect a first physical address corresponding to a first physical memory area in a first block associated with the first bank as a result of the scan;
read first valid data stored in the first block based on the first physical address; and
write the first valid data in a second block associated with the first bank,
a number of buffer units is equal to a number of banks, and
the memory controller is configured to store valid data stored in a block associated with a corresponding bank in each of the plurality of buffer units.

14. The memory system according to claim 13, wherein the memory controller is configured to:
further detect a third physical address corresponding to a third physical memory area in a first buffer unit associated with the first bank as a result of the scan;

read third valid data stored in the first buffer unit based on the third physical address; and write the third valid data together with the first valid data in the second block.

15. The memory system according to claim 1, further comprising a cache including a plurality of cache lines each of which includes a plurality of physical memory areas, wherein the memory controller is configured to store valid data associated with consecutive logical addresses in each of the plurality of cache lines.

16. The memory system according to claim 15, wherein the memory controller is configured to:

further detect a fourth physical address corresponding to a fourth physical memory area in a first cache line associated with the first bank as a result of the scan;

read fourth valid data stored in the first cache line based on the fourth physical address; and write the fourth valid data together with the first valid data in the second block.

17. The memory system according to claim 1, wherein the block is a data erasing unit.

18. The memory system according to claim 1, wherein the memory controller is configured to:

detect the first block associated with the first bank as a block to be garbage collection processed; and detect the third block associated with the first bank as a block not to be garbage collection processed.

19. The memory system according to claim 1, wherein the memory controller is configured to:

detect the first block as the block to be garbage collection processed in a case where number of valid data in the first block is equal to or less than a threshold value; and detect the third block as the block not to be garbage collection processed in a case where number of valid data in the third block is more than the threshold value.

* * * * *